Patented Mar. 6, 1923.

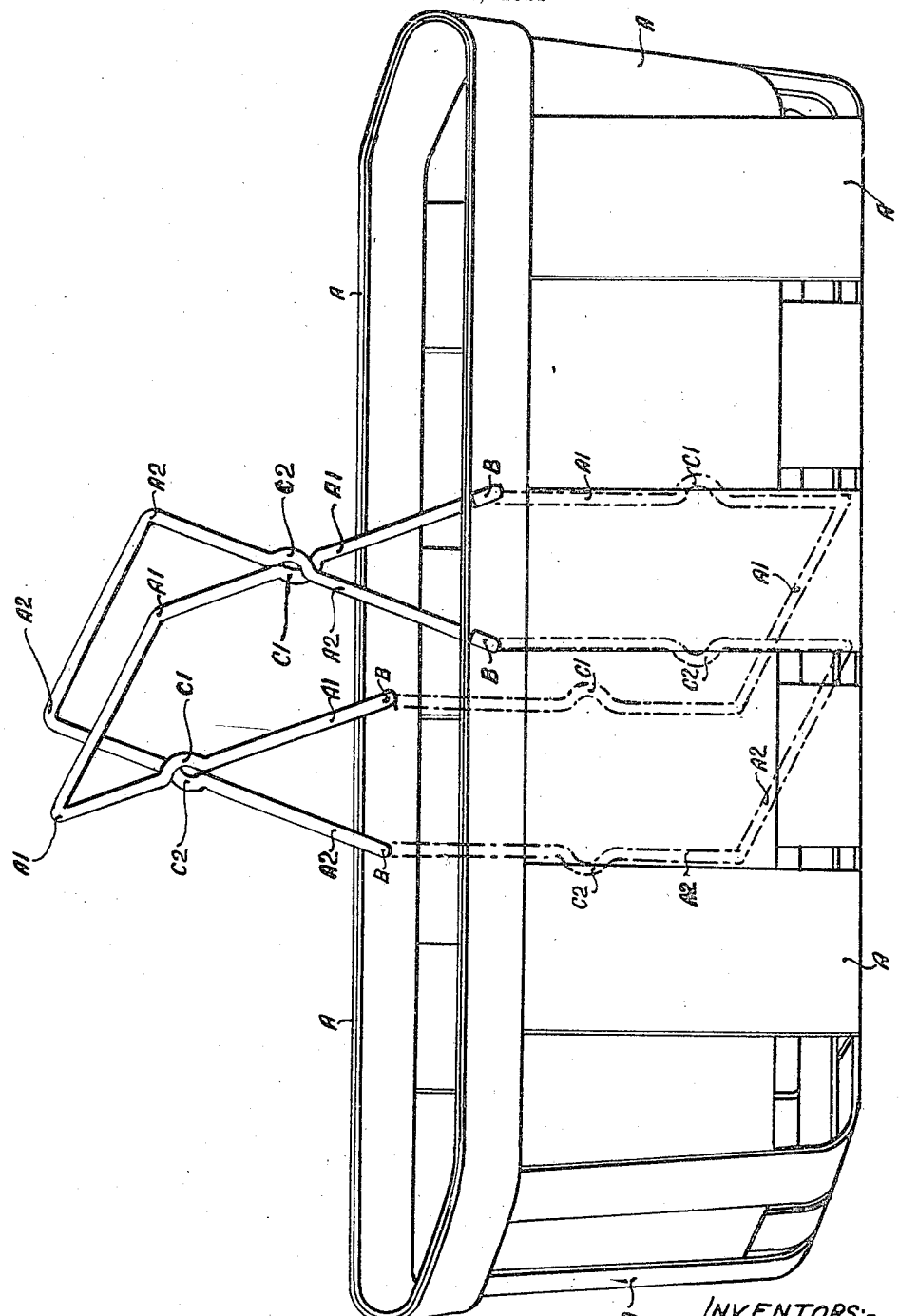

1,447,800

UNITED STATES PATENT OFFICE.

WILLIAM SEATON McLENNAN AND GEORGE THOMSON, OF GLASGOW, SCOTLAND.

HAND BASKET.

Application filed June 21, 1922. Serial No. 569,963.

*To all whom it may concern:*

Be it known that we, WILLIAM SEATON McLENNAN, cabinetmaker, and GEORGE THOMSON, engineer, both British subjects, and residents of Glasgow, Scotland, have invented certain new and useful Improvements in Connection with Hand Baskets, of which the following is the specification.

This invention relates principally to hand baskets intended for use in the transport of fruit and generally made from thin strips of wood interlaced or otherwise secured together so that a number may be nested together to lessen cost of and facilitate transport from the factory where they are produced, to the fruit growing district where they are filled.

To enable a purchaser to carry one of the baskets when filled, without inconvenience, all but the smallest sizes require to be fitted with a handle. Such handle cannot be rigidly made in a piece with the basket without interfering with the nesting of a number of them together. In some cases these handles are supplied separately from the basket and each in the form of a strip of metal of uniform width, punched with end tongues to be passed through the holes in the sides of the basket and bent over to fix the handle in position. Unless carefully handled, the edges of the tongues being sharp, and in some cases, roughly cut, are apt to injure the fingers of the person handling same. Further, if it be attempted to remove the handle, the tongues are apt to break off in bending them back to enable them to be withdrawn from the holes in the basket. Instead of the tongues, these metal handles are sometimes secured in position by pivoting their ends within the basket and punching out tongues to be turned over the edge of the basket when the handle is erected, thereby endeavouring to hold the basket horizontal when filled, even although the opposite ends thereof are unequally loaded or the pivots are not exactly in the centre of the length of the basket. This construction is only partially successful, as it does not give perfect rigidity or control. Further, should it be desired to turn down the handle again within the basket, the tongues must first be bent back to their original position, and in doing so, they are apt to be broken off and render the handle useless.

To overcome these objections, according to the present invention, each basket is fitted with a handle in two parts. Each part is shaped more or less to the contour of the inner sides and bottom of the basket, and each is pivoted at the ends thereof to the sides of the basket on opposite sides of the transverse centre of same. Thus the two parts of the handle may either be turned down so as not to interfere with the nesting of a number of the baskets together, or raised until the transverse portions of the two parts of the handle are so adjacent that they amy be conveniently gripped by one hand, the basket can then be carried horizontally without it being necessary to secure the parts in this position as their sides then extend up at an angle, and the base of the combined handle is of such width that it is immaterial whether the ends of the basket are unequally loaded or not.

The handle is of wire of such area in cross section that the transverse portions will not bend when the basket is being carried full.

Any convenient means of pivoting the ends of the two parts of the handle to the sides of the basket may be employed, for example, each end may be in the form of a ring or hook to be slipped through slots in the sides of the basket and so bent that when the parts are either erect or turned down, the rings or hooks lie at an angle to the slots, or the ends may be flattened and pivoted by a rivet passed through an aperture therein and through the side of the basket, or again, the hooks may simply be passed through holes in the sides of the basket.

If desired, means may be provided to hold the two portions of the handle rigid when in the erect position, for example, indents may be formed in the side members of each part of the handle near the outer ends thereof, indents in the side members of one part being bent inwards and those in the side members of the other part outwards. When erecting the parts, if the transverse portion of one be passed through beneath the transverse portion of the other, the indents in both will interlock and the combined handle will then be temporarily held rigid in its erect position.

When a basket is filled, the parts of the handle may be turned down to lie on the top of any covering which may have been placed over the fruit; they thus not only hold the covering in place but are also not in the way if it be desired to place a number of the filled baskets one above the other for storing purposes, or in crates for transport.

On an accompanying sheet of explanatory drawings there is shown a perspective view of a basket of the type referred to fitted with an illustrative example of the improved form of handle.

As shown in the drawing a basket A is fitted with a handle in two parts $A^1$, $A^2$, made of wire. Each part is shaped more or less to the contour of the inner sides and bottom of the basket and each is pivoted at the ends thereof to the sides of the basket on opposite sides of the transverse centre of same. The pivots are in the form of hooks B on the ends of the wires slipped through holes in the sides of the basket.

Indents $C^1$, $C^2$ are formed in the side members of each part $A^1$, $A^2$ of the handle. The indents $C^1$ in the side members of the one part $A^1$ being bent inwards and those $C^2$ in the side members of the other part $A^2$ outwards. When erecting the parts of the handle, if the transverse portion of one be passed through beneath the transverse portion of the other, the indents $C^1$, $C^2$ in both will interlock, as shown, and the handle will then be temporarily held rigid in its erect position with a width of grip determined by the position of the indents and the space between the pivots on each side of the basket.

The indents in the side members may be omitted if desired, as when the two parts $A^1$, $A^2$ of the handle are erect and the transverse portions gripped by one hand, the basket can be carried horizontally without it being necessary to secure the two parts of the handle in this position, as their sides then extend up at an angle and the base of the combined handle is of such width that it is immaterial whether the ends of the basket are unequally loaded or not.

As shown by chain lines, the two parts $A^1$, $A^2$ of the handle may also be turned down within the basket so as not to interfere with the nesting of a number of the baskets one within the other.

When the basket is full and the usual covering placed over the fruit, the two parts of the handle may be turned down to lie on the top of this covering and hold it in place. At the same time they are not in the way, if it be desired to place a number of the full baskets one above the other for storing or transport.

What we claim is:—

1. In a basket of the type referred to, a collapsible wire handle having only two parts, each shaped more or less to the contour of the inner sides and bottom of the basket, and each pivoted at its ends to the sides of the basket on opposite sides of the transverse center of same, and means adapted when the handle is in erect position to interlock and hold the two parts of the handle rigid and the transverse portions thereof separate, the latter being composed solely of wire.

2. In a basket of the type referred to, a collapsible wire handle having only two parts, each shaped more or less to the contour of the inner sides and bottom of the basket, and each pivoted at its ends to the sides of the basket on opposite sides of the transverse center of same, and interlocking detents adapted, when the handle is in erect position, to hold the two parts of the handle rigid and the transverse portions thereof separate, the latter being composed solely of wire.

In testimony whereof we have signed our names to this specification.

WILLIAM SEATON McLENNAN.
GEORGE THOMSON.